United States Patent [19]
Alford

[11] Patent Number: 4,960,382
[45] Date of Patent: Oct. 2, 1990

[54] EDUCATIONAL WRITING BOARD KIT

[76] Inventor: Archie W. Alford, 1100 SE. 19th Ter., Gainesville, Fla. 32601

[21] Appl. No.: 299,672

[22] Filed: Jan. 23, 1989

[51] Int. Cl.⁵ .......................... G09B 11/04; B43L 1/12
[52] U.S. Cl. ............................ 434/164; 273/DIG. 30; 434/172; 434/410
[58] Field of Search ................ 434/164, 410, 172, 224; 273/DIG. 30

[56] References Cited
U.S. PATENT DOCUMENTS

| | | | |
|---|---|---|---|
| 1,857,009 | 5/1932 | Amor | 434/172 |
| 3,063,164 | 11/1962 | Pellegrino et al. | 434/410 |
| 3,277,589 | 10/1966 | Berdan et al. | 434/224 |
| 3,827,164 | 8/1974 | Hale | 434/410 X |

*Primary Examiner*—William H. Grieb
*Attorney, Agent, or Firm*—Edward M. Livingston

[57] ABSTRACT

An early-life educational device comprised of a waxed-surface writing pad with hook and loop fastening means on a translucent sheet for pull-away erasing of practice writing and drawing with templates. The templates are stored in a foldable storage container which is held in an up-right position. Its objectives are effective, low-cost, clean, convenient and interesting educational use for young children.

11 Claims, 1 Drawing Sheet

EDUCATIONAL WRITING BOARD KIT

BACKGROUND OF THE INVENTION

This invention relates to educational tools and instruments, more particularly to an apparatus and method of educating young children in recognizing and writing letters and numbers, in drawing basic objects of early-life learning, and in forming and writing words and sentences in relationship to such learning.

When young children are first learning to write letters and numbers they often find it very difficult to control the movement of their writing hand to properly form the letters and numbers. This difficulty may be due to lack of sufficient eye-hand coordination and muscle memory. Thus, there exists a need for an apparatus and method to improve such coordination and decrease the time it takes for children to learn how to write letters, numbers and even sentences.

Devices in the prior art consist of the well-known wax-like black or otherwise colored pad having a translucent sheet of plastic that is placed over it and written on with a stylus, wherein the lifting of the plastic sheet has an erasing effect.

Another example of prior art in this field includes U.S. Pat. No. 3,063,164. In that patent, there were templates traceable on plastic sheets on the front of the basic wax pad. But there was no means for holding the templates in lines for forming words. In U.S. Pat. No. 3,827,164, there was a means for holding characters and sentences in line, but the characters it contained in line were not templates that could be traced to provide initial training of young children in hand movement for forming characters. Also, the means for containing the characters and sentences in line were protrusions which could interfere with hand movement for effective writing and drawing.

SUMMARY OF THE INVENTION

One object of this invention is to provide a convenient, low-cost and interesting device for educating children during early-age formative years to recognize and to write single letters and numbers.

Another object of this invention is to provide a convenient, low-cost and interesting device for educating children during early-age formative years to form words from letters and complex numbers from single digits.

Another object of this invention is to provide a convenient, low-cost and interesting device for educating children during early-age formative years to relate words to objects and to draw basic objects defined by such words.

Another object of this invention is to provide an early-life learning device that can easily be set up, used and then stored for later use.

Another object of this invention is to provide an early-life learning device that is inherently clean without writing-chalk or lead dust.

Another object of this invention is to provide an early-life learning device without writing instruments that can leave color marks on furniture and walls.

This invention accomplishes the above objects by providing an apparatus consisting of a writing pad comprising a colored writing board with a smooth waxed surface; a translucent plastic sheet with one edge attachable to one edge of the writing board; parallel lines of fastening means on a front surface of the plastic sheet; rectangular templates having fastening means at edges of top and bottom back surfaces in corresponding parallel relationship to the parallel lines of fastening means on the front surface of the plastic sheet; and a template container attachable in foldable relationship to the writing board. Hook and loop fastening materials in parallel lines are positioned on the front of the plastic sheet to hold correspondingly hook and loop fastening material top and bottom backs of plastic sheet templates.

DESCRIPTION OF THE DRAWINGS

This invention is described in claims in relationship to a description of preferred embodiments and the following drawings wherein:

DESCRIPTION OF THE PREFERRED EMBODIMENT

Figure 1:
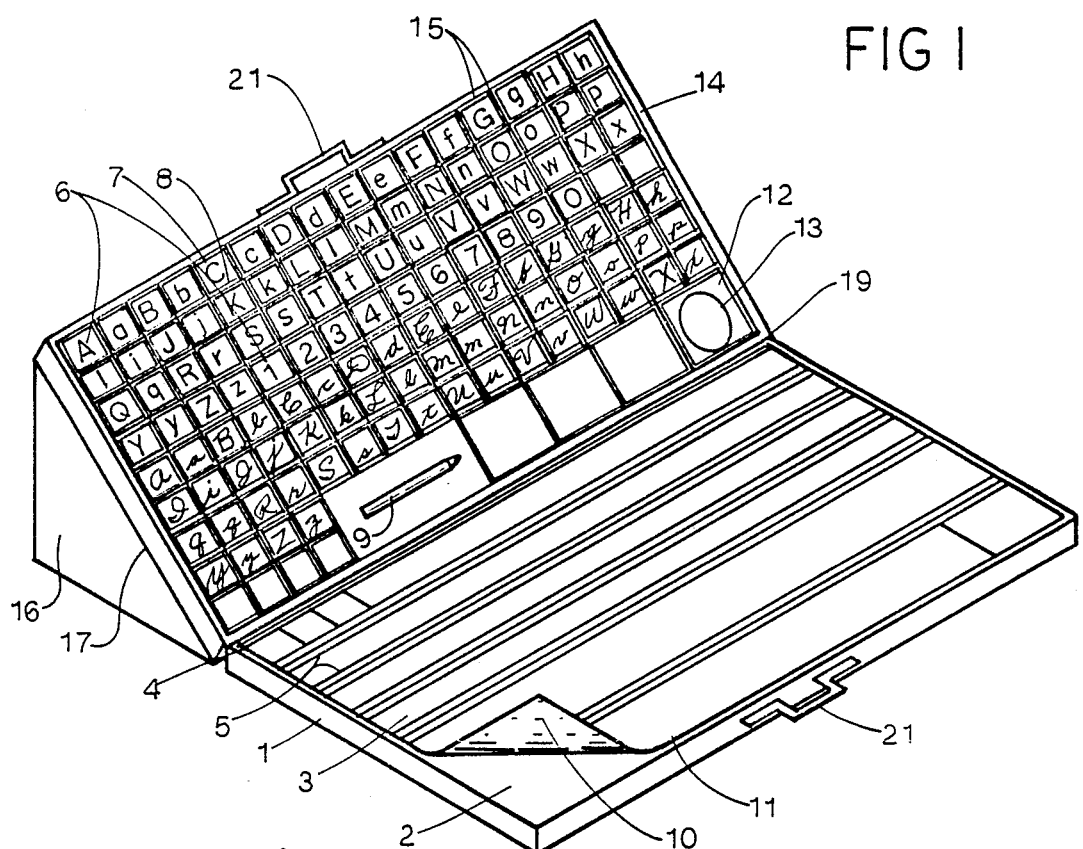
FIG 1 is a perspective view from the top, front and side in opened use condition.

Referring to FIG. 1, a writing pad 1 is provided with a colored surface 2 that has a wax-like smooth finish. A translucent plastic sheet 3 is attachable to the writing pad 1 at an attachment edge 4 that is common to both the writing pad 1 and the plastic sheet 3. Parallel lines of hook and loop fastening material 5 are attached to the top of the plastic sheet 3. The distance between the parallel lines of hook and loop fastening material 5 is sufficient for positioning alphabetical and numerical templates 6 between the said parallel lines.

The alphabetical and numerical templates 6 can be rectangular or optionally square with matching hook and loop fastening material on the top back surface 7 and the bottom back surface 8 of each template 6. The templates 6 can be grooved plastic plates with a suitably thin and pliable back surface to allow pressure from a stylus-like writing instrument 9 to be transmitted through the back surface of the templates and through the plastic sheet 3 and cause the color of the colored surface 2 to be visible through the translucent plastic sheet 3. The plastic sheet 3 is liftable as indicated by a lifted portion 10 shown in FIG. 1.

There can be two widths of hook and loop fastening material between each two parallel lines and only one width at the top and attachment edge 4 and a liftable end 11.

The parallel lines of hook and loop fastening material can be farther apart than portions of the plastic sheet 3 to accommodate larger templates 12 depicting objects such as a ball 13.

The alphabetical and numerical templates 6 and object or pictorial larger templates 12 can be stored in foldable container 14 having partition walls 15. Stylus-like writing instruments 9 also can be storable in the foldable container 14.

Figure 2:
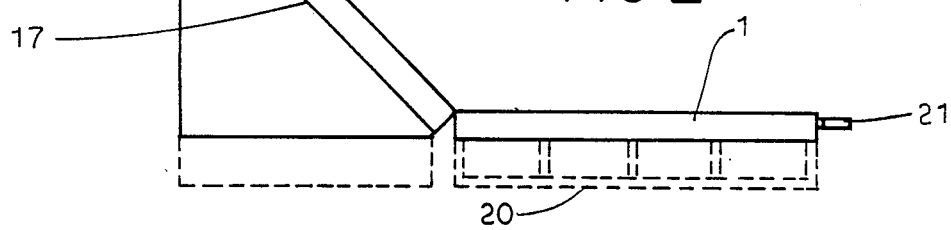
FIG. 2 is a side view in opened use condition.
Figure 3:
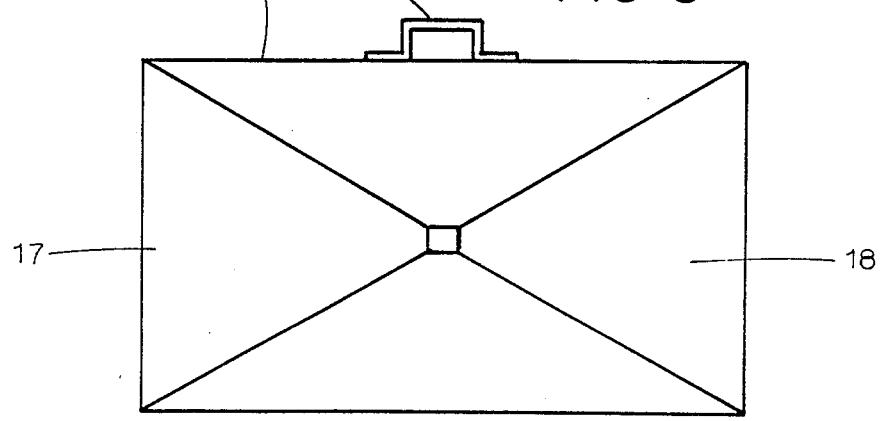
FIG. 3 is a rear view in folded condition.

Referring to FIGS. 2 and 3, foldable support members 16 can be provided for supporting the foldable container 14 in a slanting position that aids vision and accessibility of the templates. The foldable support members can be stiff cardboard or plastic-like material with a left bendable support attachment 17 and a right bendable attachment 18.

The foldable container 14 can be attached to the writing pad 1 at a foldable hinge line 19. The attachment means can be a bendable plastic means or such other low-cost material as appropriate.

Approximately three templates of each letter of the alphabet and each numerical digit are suggested for each partition.

Additional object and pictorial templates can be stored in optional storage space 20 in the body of an optionally thick writing pad 1. This storage space can be particularly useful for storing pictorial templates.

A handle 21 is attachable to the edge of the foldable container 14 which folds against the plastic sheet 3 and to the corresponding edge of the writing pad 1 for hand-carrying the educational writing board kit in a closed condition.

Thus, as hereinabove it apparent this invention provides a novel and non-obvious apparatus and method for helping young children to learn to write letters, numbers, pictorial symbols and even sentences which is effective, clean, inexpensive and interesting.

LIST OF COMPONENTS

1. Writing pad
2. Colored surface
3. Translucent plastic sheet
4. Attachment edge
5. Parallel lines of VELCRO-like material
6. Alphabetical and numerical templates
7. Top back surface surface of template
8. Bottom back surface of template
9. Stylus-like writing instrument
10. Lifted portion of plastic sheet
11. Liftable end of plastic sheet
12. Larger templates
13. Pictorial ball
14. Foldable container
15. Partition walls
16. Foldable support members
17. Left bendable attachment
18. Right bendable attachment
19. Foldable hingeline
20. Optional storage space
21. Handle

I claim:

1. An educational writing board kit comprising:
   a colored writing board with a smooth waxed surface;
   a translucent plastic sheet with one edge attachable to one edge of the writing board;
   parallel lines of fastening means on a front surface of the plastic sheet, said fastening means consisting of hook and loop fastening material;
   rectangular templates having fastening means at edges of top and bottom surfaces in corresponding parallel relationship to the parallel lines of fastening means on the front surface of the plastic sheet, said fastening means consisting of hook and loop fastening material; and
   a template container attachable in foldable relationship to the writing board.

2. An educational writing board kit according to claim 1 wherein the rectangular templates are plastic plates with indentations sized and shaped to receive a stylus-like writing instrument.

3. An educational writing board kit according to claim 1 wherein the rectangular templates are plastic-like plates sufficiently thin and pliable to allow hand-writing pressure on a stylus-like writing instrument to transfer the hand-writing pressure through the backs of templates and through the translucent plastic sheet to the writing board sufficiently to allow color of the board to be seen through the translucent plastic sheet where the stylus-writing instrument has been in writing contact with the bottoms of template grooves in the plastic-like plates and the templates have been removed.

4. An educational writing board kit according to claim 1 wherein the rectangular templates outline forms of alphabetical and numerical characters.

5. An educational writing board kit according to claim 4 wherein proper sequence of formation of characters is indicated adjacent to such parts on the front of the templates.

6. An educational writing board kit according to claim 1 wherein the rectangular templates outline forms of educational objects.

7. An educational writing board kit according to claim 1 comprising:
   parallel fastening means on the front of the plastic sheet and at edges of top and bottom back surfaces of the template comprised of a hook and loop fastening material; and
   rectangular templates that are plastic-like plates sufficiently thin and pliable to allow hand-writing pressure on a stylus-like writing instrument to transfer the hand-writing pressure on a stylus-like writing instrument to transfer the hand-writing pressure through the backs of templates and through the translucent plastic sheet to the writing board sufficiently to allow the color of the board to be seen through the translucent plastic sheet where the styluslike writing instrument has been in writing contact with the bottoms of template grooves in the plastic-like plates and the templates have been removed.

8. An educational writing board kit according to claim 7 and comprising:
   rectangular templates which outline forms of alphabetical, numerical and other educational objects.

9. An educational writing board kit according to claim 8 and further comprising foldable appendages on the template container sized and positioned to hold the container in a slanting relationship for ease of visibility of templates contained therein when the writing board is being used; and
   a handle attachable to the edge of the foldable container which folds against the plastic sheet and to the corresponding edge of the writing pad for hand-carrying the educational writing board kit in a closed condition.

10. An educational writing board kit according to claim 1 and further comprising foldable appendages on the template container sized and positioned to hold the container in a slanting relationship for ease of visibility of templates contained therein when the writing pad is being used.

11. A method for using an educational writing board kit consisting of:
    a colored writing board with a smooth waxed surface;
    a translucent plastic sheet with one edge attachable to one edge of the writing board;
    parallel lines of fastening means comprised of hook and loop fastening material on a front surface of the plastic sheet;
    rectangular templates that are plastic-like plates sufficiently thin and pliable to allow handwriting pressure on a stylus-like writing instrument to transfer the hand-writing pressure through the backs of templates and through the translucent plastic sheet to the writing board sufficiently to allow the color of the board to be seen through the translucent plastic sheet where the stylus-like writing instrument has been in writing contact with the bottoms of template grooves in the plastic-like plates and the templates have been removed;

hook and loop fastening means at edges of top and bottom back surfaces of the rectangular templates in correspondingly parallel relationship to the parallel lines of fastening means of the front surface of the plastic sheet;

a template container attachable in foldable relationship to the writing board; and foldable appendages on the template container sized and positioned to hold the container in a slanting relationship for ease of visibility of templates contained therein when the writing board is being used and comprising:

unfolding the foldable container from folding relationship to the writing board.

positioning the foldable appendages of the template container in a manner to support the container in a slanting relationship to the writing board;

placing characters to be learned between the parallel lines of hook and loop fastening material like fastening means on the plastic sheet;

tracing template grooves with a stylus-like writing instrument sufficiently to achieve selective familiarity and dexterity;

reproducing the characters on portions of the plastic not occupied by characters to achieve selective familiarity and dexterity in relationship to the characters without aid of the templates;

removing the templates from the hook and loop fastening means;

replacing the characters in the containers; and lifting the plastic sheet from the colored writing board while leaving one edge of the sheet attached to the writing board to remove characters drawn on it for further practice and learning.

* * * * *